(12) United States Patent
Ylonen (10) Patent No.: US 8,712,759 B2
(45) Date of Patent: Apr. 29, 2014

(54) SPECIALIZING DISAMBIGUATION OF A NATURAL LANGUAGE EXPRESSION

(75) Inventor: Tatu J. Ylonen, Espoo (FI)

(73) Assignee: Clausal Computing Oy (FI)

( * ) Notice: Subject to any disclaimer, the term of this patent is extended or adjusted under 35 U.S.C. 154(b) by 676 days.

(21) Appl. No.: 12/910,408

(22) Filed: Oct. 22, 2010

(65) Prior Publication Data

US 2011/0119049 A1 May 19, 2011

Related U.S. Application Data

(60) Provisional application No. 61/261,272, filed on Nov. 13, 2009.

(51) Int. Cl.
*G06F 17/27* (2006.01)

(52) U.S. Cl.
USPC ................................. 704/9; 704/257; 704/7

(58) Field of Classification Search
USPC ............ 704/1–10, 251, 255, 257, 270, 270.1, 704/277
See application file for complete search history.

(56) References Cited

U.S. PATENT DOCUMENTS

| 6,944,603 | B2 | 9/2005 | Bergan | |
|---|---|---|---|---|
| 6,950,814 | B2 | 9/2005 | Bergan | |
| 7,523,079 | B2 | 4/2009 | Athelogou | |
| 7,788,085 | B2 * | 8/2010 | Brun et al. | 704/9 |
| 2001/0056445 | A1 | 12/2001 | Meystel | |
| 2003/0130976 | A1 | 7/2003 | Au | |
| 2008/0275694 | A1 | 11/2008 | Varone | |

OTHER PUBLICATIONS

J. Nica et al: Combining EWN and Sense-Untagged Corpus for WSD, CICLing 2004, LNCS 2945, pp. 188-200, Springer-Verlag, 2004.
Marjorie McShane: Reference Resolution Challenges for an Intelligent Agent: The Need for Knowledge, IEEE Intelligent Systems, 24(4), pp. 47-58, Jul./Aug. 2009.
R. Navigli: Word Sense Disambiguation: A Survey, Computing Surveys, 41(2), pp. 10:1-10:69, Feb. 2009.

* cited by examiner

*Primary Examiner* — Huyen X. Vo (57) ABSTRACT

Disambiguation of the meaning of a natural language expression proceeds by constructing a natural language expression, and then incrementally specializing the meaning representation to more specific meanings as more information and constraints are obtained, in accordance with one or more specialization hierarchies between semantic descriptors. The method is generalized to disjunctive sets of interpretations that can be specialized hierarchically.

18 Claims, 6 Drawing Sheets

SPECIALIZING DISAMBIGUATION OF A NATURAL LANGUAGE EXPRESSION

CROSS-REFERENCE TO RELATED APPLICATIONS

This is a non-provisional application of U.S. provisional patent application 61/261,272, filed Nov. 13, 2009, by the present inventor, which is hereby incorporated herein by reference.

INCORPORATION-BY-REFERENCE OF MATERIAL SUBMITTED ON ATTACHED MEDIA

Not Applicable

TECHNICAL FIELD

The present invention relates to computational linguistics, particularly to disambiguation of ambiguities and reference resolution in connection with parsing natural language.

BACKGROUND OF THE INVENTION

When computers interpret natural language, selecting the correct interpretation for each word in the expression is very important. An introduction to the disambiguation and reference resolution art can be found from:

Marjorie McShane: Reference Resolution Challenges for an Intelligent Agent: The Need for Knowledge, IEEE Intelligent Systems, 24(4):47-58, July/August 2009

R. Navigli: Word Sense Disambiguation: A Survey, Computing Surveys, 41(2), pp. 10:1-10:69, February 2009.

An overview of knowledge representation methods can be found in R. Brachman et al: Knowledge Representation and Reasoning, Elsevier, 2004. Detailed treatments of semantic networks can be found in J. F. Sowa: Conceptual Structures: Information Processing in Mind and Machine, Addison-Wesley, 1984; J. F. Sowa: Principles of Semantic Networks: Explorations in the Representation of Knowledge, Morgan Kaufmann, 1991; and H. Helbig: Knowledge Representation and the Semantics of Natural Language, Springer, 2006.

All of the above mentioned references are hereby incorporated herein by reference in their entirety.

Despite extensive research, natural language parsing systems still have many shortcomings in disambiguation and reference resolution, as illustrated by McShane (2009).

BRIEF SUMMARY OF THE INVENTION

A first aspect of the invention is a processor-implemented method of semantically parsing natural language, comprising:
 constructing a first ambiguous meaning representation for a natural language expression; and
 fully or partially disambiguating the first meaning representation by specializing it by replacing a first semantic descriptor in it by a second, more specific semantic descriptor.

A second aspect of the invention is a processor-implemented method of semantically parsing natural language, comprising:
 constructing a meaning representation of a natural language expression, the representation comprising a pointer to a first semantic descriptor logically organized in one or more specialization hierarchies; and
 in response to a later parsing or disambiguation action, changing the pointer to point to a second semantic descriptor that is a specialization of the first semantic descriptor in a first specialization hierarchy.

A third aspect of the invention is controlling disambiguation and reference resolution by actions associated with grammar rules or constructions. Such actions may be executed and disambiguation performed when a rule is reduced (LR parsing) or parsing table nodes are constructed (chart parsing).

A fourth aspect of the invention is constructing relations with ambiguous relation types, and disambiguating the relation type afterwards.

A fifth aspect of the invention is a method of combining and disambiguating when one constituent is an inserted or moved elliptic constituent.

A sixth aspect of the invention is a method of performing reference resolution by disambiguation. Reference resolution and disambiguation may be a combined process.

A seventh aspect of the invention is a method of interpreting metaphor by specialization. Some of the metaphoric specializations may be generated dynamically by rules.

An eighth aspect of the invention is a method of interpreting compound words using specializing disambiguation.

A ninth aspect of the invention is a method of interpreting abbreviations using specializing disambiguation.

A tenth aspect of the invention is a method of interpreting proper names using specializing disambiguation.

An eleventh aspect of the invention is a method of enumerating specializations for a meaning representation, in part using specialization hierarchy generating rules.

A twelfth aspect of the invention is a method of recognizing phrasal verbs by specialization and using a lexical particle relation.

A thirteenth aspect of the invention is a method of incrementally disambiguating the meaning of a natural language expression, by first partially disambiguating some ambiguous aspect of it, and then further disambiguating the same aspect of it.

A fourteenth aspect of the invention is an apparatus containing components for performing the steps of any of the method aspects of the invention.

A fifteenth aspect of the invention is an apparatus comprising:
 a meaning representation constructor coupled to a processor implementing at least part of a natural language processing system for the apparatus; and
 a specializing disambiguator coupled to the meaning representation constructor and at least one specialization hierarchy.

A sixteenth aspect of the invention is an apparatus comprising a processor coupled to a meaning representation constructor and a specializing disambiguator coupled to at least one specialization hierarchy. Such an apparatus may advantageously also comprise a specialization hierarchy generator.

A seventeenth aspect of the invention is an apparatus comprising:
 a means for constructing a first ambiguous meaning representation for a first natural language expression; and
 a means for fully or partially disambiguating the first meaning representation by specializing it by replacing a first semantic descriptor in it by a second, more specific descriptor.

An eighteenth aspect of the invention is a computer-readable medium operable to cause a computer to perform semantic parsing, comprising:

computer readable program code means for constructing a first ambiguous meaning representation for a natural language expression; and     computer readable program code means for fully or partially disambiguating the first meaning representation by specializing it by replacing a first semantic descriptor in it by a second, more specific semantic descriptor.

DETAILED DESCRIPTION OF THE INVENTION

The aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, a computer, or a computer program product which is an aspect of the invention may comprise any number of the embodiments or elements of the invention described in this specification.

Separate references to "an embodiment", "one embodiment", or "another embodiment" refer to particular embodiments or classes of embodiments (possibly different embodiments in each case), not necessarily all possible embodiments of the invention. References to "an entity" in the claims mean "at least one" such entity. "First", "second", etc. entities refer to different entities, unless otherwise noted. Unless otherwise mentioned, "or" means either or both, or in a list, one or more of the listed items.

In this specification, ambiguous means that something has more than one interpretation, reference, meaning, or alternative (together called choices). Disambiguation is the process of selecting one choice from among the many. Reference resolution is one aspect of disambiguating a natural language expression. Non-disambiguated means that something that has not yet been disambiguated and may thus have more than one choice. Disambiguated means that something is not ambiguous (but may have been originally), or is less ambiguous than it originally was.

Partial disambiguation means that ambiguity of something is reduced (i.e., the number of possibilities is reduced), but not completely resolved to a single interpretation, meaning, or alternative.

Actual nodes, actual relations, or actual semantic representations refer to the kinds of objects or representations typically used for semantic representation in the system for disambiguated data (preferably a representation compatible with the knowledge base). Commonly used actual semantic representations include semantic networks and logic formulas. Disambiguating something into an actual node or relation may involve, in addition to the disambiguation, conversion to the actual representation (e.g., data types or structures) used for the knowledge base or constructing new knowledge representation components that are compatible with the knowledge base. Not all embodiments necessarily have a knowledge base, however.

Natural language expression means an utterance, sentence, paragraph, document, or other natural language input or part thereof. A constituent means a part of the natural language expression, usually parsed into an internal representation (such as a parse tree or a semantic representation), as determined by the grammar (sometimes each grammar rule is considered a constituent, but this is not always the case; the intention is not to restrict to strictly linguistic or strictly grammar-oriented interpretation). Examples of constituents include words, noun phrases, verb phrases, clauses, sentences, etc. A (parsed) constituent preferably includes a meaning representation.

Some constituents may be created or inserted by the parser without having a realization in the natural language expression (in linguistics they are sometimes said to be realized as zeroes). Such constituents are sometimes used for handling ellipsis and representing relations that are implied by the syntax but that have no characters to represent them (e.g., the relation for the subject of a clause in some languages). In many embodiments, a non-disambiguated node is created for representing a constituent in a non-disambiguated semantic representation, but a non-disambiguated relation may also be generated for some constituents.

A parse is used as a technical term for an alternative interpretation of a natural language expression. It refers to a way in which the parser can interpret the natural language expression according to the grammar and semantics. In some embodiments, a parse includes the interpretation from the beginning of the input to the current position, whereas in some other embodiments it refers to the interpretation from some intermediate position to the current position. Parses may be represented by data structures called parse contexts. Discourse context refers to a data structure that holds information about an ongoing discourse, such as interaction with the user or reading the document. A discourse context may comprise information about many natural language expressions used by a number of parties to the discourse, the participants, their background knowledge, etc. It may also track quoted speech, e.g., using nested discourse contexts.

Figure 5:
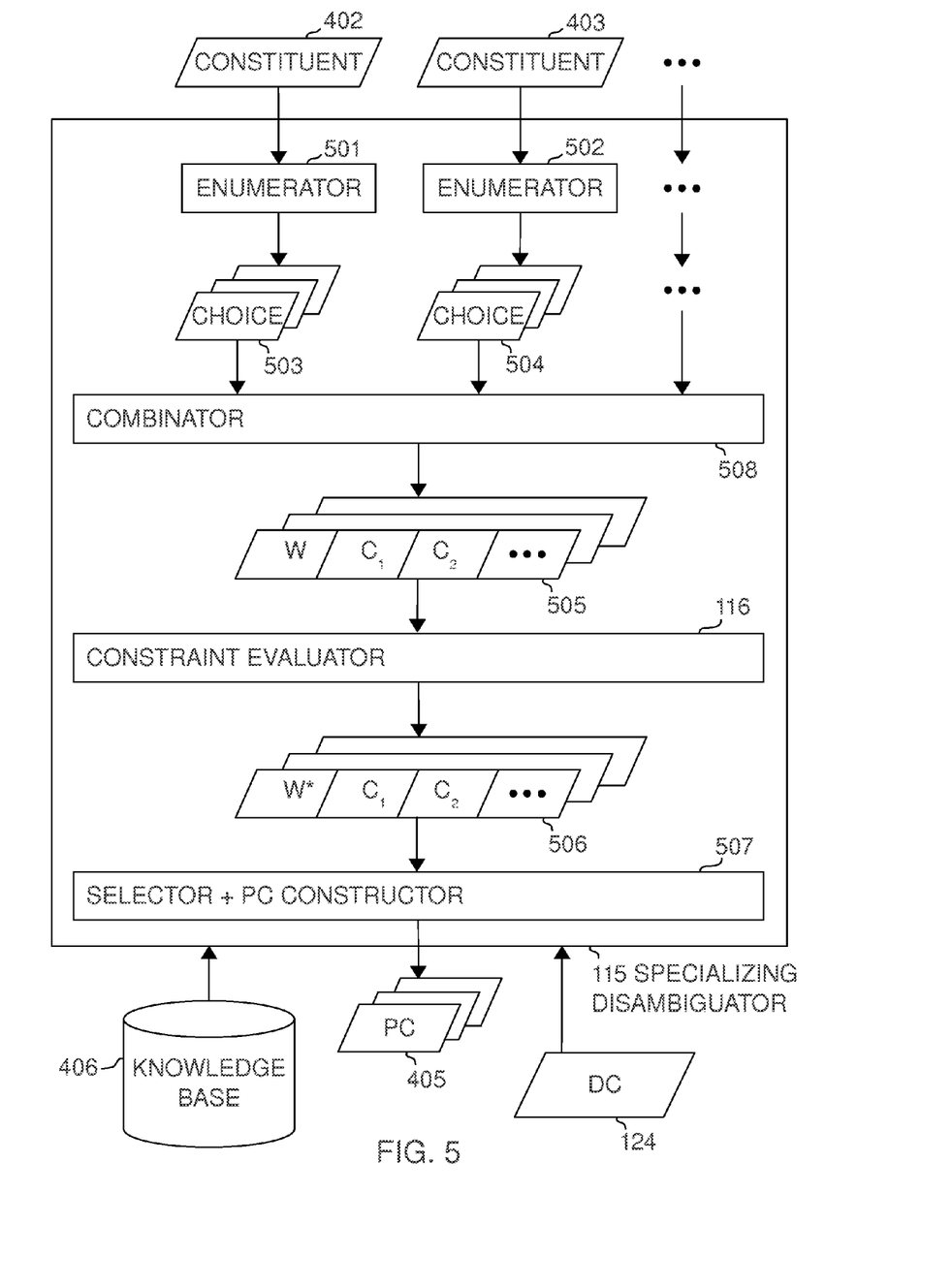
FIG. 5 illustrates data flow in a specializing disambiguator in an embodiment.

A weight means a value used to measure the goodness of an alternative. Such weights are sometimes also called scores. In some embodiments, the weights may be probabilities, likelihoods, or logarithms of likelihoods. In some others, they may represent possibility. They may also be fuzzy values, values in a partially ordered lattice, or any other suitable values for measuring the relative goodness of alternative parses or interpretations of a natural language input. While the specification has been written as higher weights meaning more likely parses, naturally the polarity could be reversed. In some systems it may be desirable to restrict weights to the range [0,1] or [−1,1]. The best weight means the weight indicating the parse or selection that is most likely to be the correct one; in the preferred embodiment, it is the highest weight. "A priori weight" is used to refer to the weight "W" of choices (503, 504) or combinations (505) before applying the constraint evaluator (120) to them. "A posteriori weight" is used to refer to the weight "W*" of the combinations (506) after applying the constraint evaluator to them.

A meaning representation refers to a representation of the meaning or semantics of some natural language expression (e.g., a symbol, morpheme, word, phrase, clause, sentence, or a larger unit). A meaning representation may be ambiguous. Such ambiguity may be represented in several ways, such as having multiple alternatives related disjunctively (i.e., in logical (inclusive) "or" relation to each other). Each such alternative may be associated with a weight. The meaning representation (or alternatives therein) may also contain pointers to semantic descriptors or other meaning representation units. A semantic descriptor is a data structure representing some aspect of meaning. It may be, e.g., a concrete single individual or event stored in the knowledge base, a set or class of individuals or events, an attribute value, or a generalization of individuals or events. Semantic descriptors frequently contain slots (semantic or thematic roles or arguments) whose values vary from case to case and that are often filled during parsing, and constraints related to the kinds of values that may fill each slot.

Semantic descriptors may already exist in the database (as is typically the case for descriptors returned for definite referring expressions), whereas in other cases they may be generated dynamically using specialization rules. Such specialization rules may be used for, e.g., generating individuals for indefinite references or constructing metaphorical interpretations.

A semantic descriptor, meaning representation, or some other data structure may be either modified by overwriting some of its data, or it may be managed functionally without modifying the original (essentially constructing a new data structure with some fields having different values from the original.

Semantic parsing means the process of parsing or interpreting a natural language expression and producing a meaning representation from it. It does not necessarily require that the meaning representation be returned from a parse operation; instead, parsing could be a continuous process that processes the constructed meaning representations at some points (using a discourse context).

Various disambiguation methods have been disclosed in the co-owned patent applications U.S. Ser. No. 12/622,272 (Joint disambiguation of the meaning of a natural language expression), filed Nov. 27, 2009, and U.S. Ser. No. 12/622,589 (Joint disambiguation of syntactic and semantic ambiguity), filed Nov. 27, 2009. These applications are hereby incorporated herein by reference. This specification builds on the enumeration, constraint evaluation and selection methods described in more detail therein. The descriptions of joint disambiguation and multi-context disambiguation can be found in them.

Figure 1:
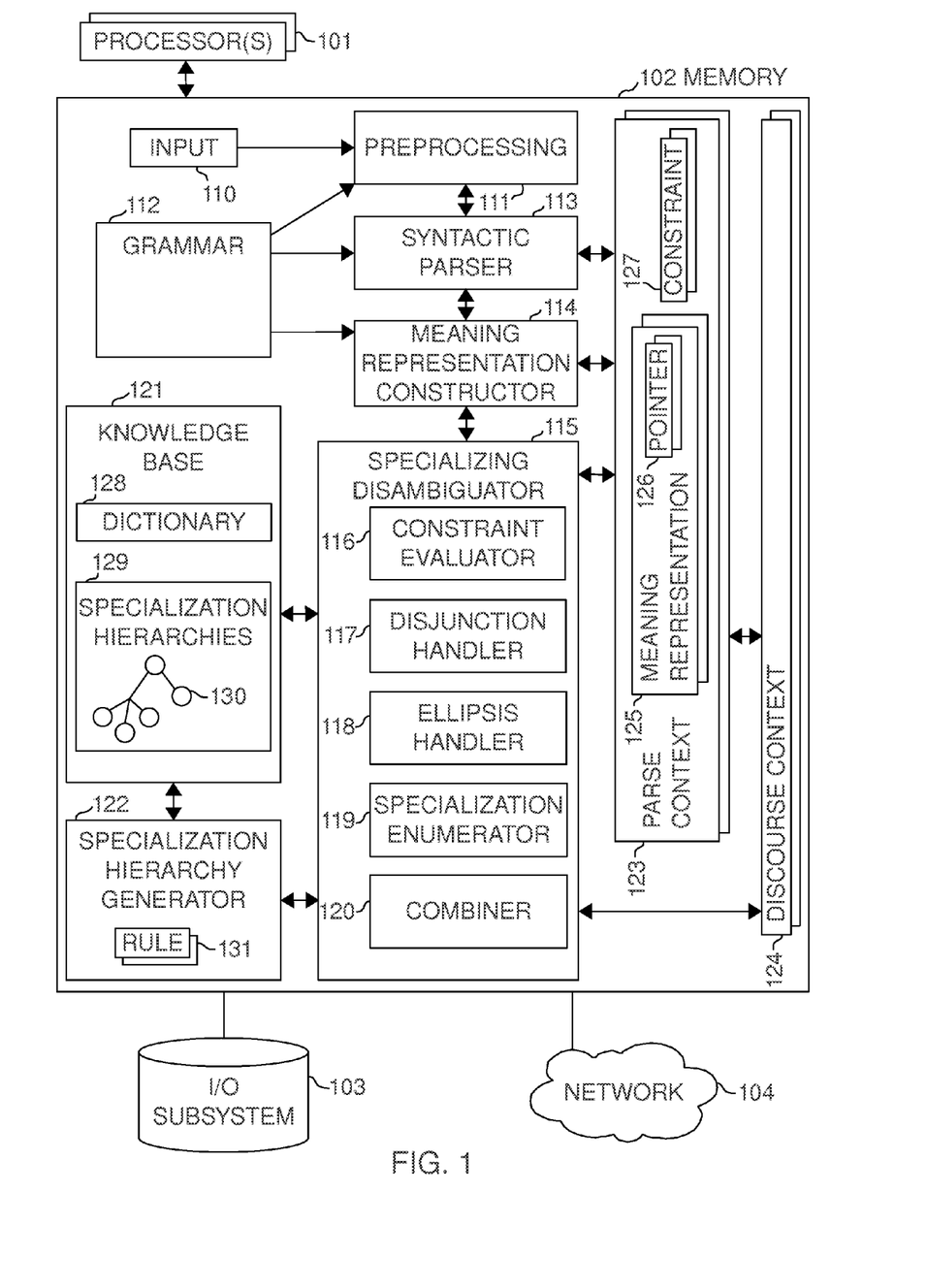
FIG. 1 illustrates an apparatus embodiment of the invention.

FIG. 1 illustrates an apparatus (computer) embodiment of the invention. (101) illustrates one or more processors. The processors may be general purpose processors, or they may be, e.g., special purpose chips or ASICs. Several of the other components may be integrated into the processor. (102) illustrates the main memory of the computer (a computer-readable memory, typically RAM). (103) illustrates an I/O subsystem, typically comprising mass storage (such as magnetic, optical, or semiconductor disks, tapes or other storage systems, and/or RAID subsystems). It frequently also comprises a display, keyboard, speaker, microphone, camera, manipulators, and/or other I/O devices. (104) illustrates a network interface; the network may be, e.g., a local area network, wide area network (such as the Internet), digital wireless network, or a cluster interconnect or backplane joining processor boards and racks within a clustered or blade-based computer. The I/O subsystem and network interface may share the same physical bus or interface to interact with the processor(s) and memory, or may each have one or more independent physical interfaces. Additional memory may be located behind and accessible through such interfaces, such as memory stored in various kinds of networked storage (e.g., USB tokens, iSCSI, NAS, file servers, web servers) or on other nodes in a distributed non-shared-memory computer.

An apparatus that is an embodiment of the invention may also comprise, e.g., a power supply (which may be, e.g., a switching power supply, battery, fuel cell, photovoltaic cell, generator, or any other known power supply), circuit boards, cabling, various electromechanical parts, casings, cablings, connectors, support structures, feet, wheels, rollers, propulsion systems, and/or mounting brackets. An apparatus might be a computer, a robot, a home appliance (such as a voice controlled microwave oven, alarm system, television, entertainment center, or videogame), office appliance (e.g., voice-controlled word processing system or office assistance system), building automation system controller, process or automation controller, etc. Apparatuses may also comprise any components that are conventionally included in such devices, as taught by US patents and generally available technical literature. The present invention may be used in, e.g., an intelligent control unit in such apparatuses, enabling smoother and more robust natural language interaction with users, therefore increasing the value and competitiveness of such apparatuses.

(110) illustrates an input to be processed using a natural language processing system. The original input may be a string, a text document, a scanned document image, digitized voice, or some other form of natural language input to the parser. The input passes through preprocessing (111), which may perform OCR (optical character recognition), speech recognition, tokenization, morphological analysis (e.g., as described in K. Koskenniemi: Two-Level Morphology: A General Computational Model for Word-Form Recognition and Production, Publications of the Department of General Linguistics, No. 11, University of Helsinki, 1983), morpheme graph construction, etc., as required by a particular embodiment. It may also perform unknown token handling. The grammar may configure the preprocessor (e.g., by morphological rules and morpheme inventory). Especially in embodiments performing voice recognition or OCR, at least parts of the preprocessing may be advantageously implemented in hardware (possibly integrated into the processor(s) (101)), as described in, e.g., G. Pirani (ed.): Advanced Algorithms and Architectures for Speech Understanding, Springer-Verlag, 1990, and E. Montseny and J. Frau (eds.): Computer Vision: Specialized Processors for Real-Time Image Analysis, Springer-Verlag, 1994. Generally the input may encode any natural language expression (though not all possible expressions are necessarily supported by the grammar and other components).

The grammar (112) is preferably a unification-based extended context-free grammar (see, e.g., T. Briscoe and J. Carroll: Generalized Probabilistic LR Parsing of Natural Language (Corpora) with Unification-Based Grammars, Computational Linguistics, 19(1):25-59, 1993), though other grammar formalisms can also be used. In some embodiments the original grammar may not be present on the computer, but instead data compiled from the grammar, such as a pushdown automaton, byte code, and/or unification actions, may be used in its place. In some embodiments the grammar may be at least partially automatically learned and may be stored in the knowledge base (121). The grammar may include actions for controlling when to (partially) disambiguate the meaning of a natural language expression. It may, for example, cause the instantiation to be performed after parsing each noun phrase or clause.

(113) illustrates a parser capable of parsing according to the formalism used for the grammar. It may be, for example, an extended generalized LR parser (see, e.g., M. Tomita: Efficient Parsing for Natural Language: A Fast Algorithm for Practical Systems, Kluwer, 1986) with unification. The parser may produce parse trees (or a graph-structured parse forest), unification feature structures, a semantic network, or other output, from which a non-disambiguated meaning representation can be constructed, or it may directly produce one or more meaning representations, using either hand-coded rules (similar to, e.g., G. Hendrix et al: Developing a Natural Language Interface to Complex Data, ACM Transactions on Database Systems, 3(2):105-147, 1978) or (semi-)automatically learned rules (similar to, e.g., L. Zettlemoyer et al: Learning Context-dependent Mappings from Sentences to Logical Form, in Proceedings of the Joint Conference of the Association for Computational Linguistics and International Joint Conference on Natural Language Processing (ACL-IJCNLP), 2009; or L. Tang and R. Mooney: Using Multiple Clause Constructors in Inductive Logic Programming, ECML 2001, Lecture Notes in Computer Science 2167, Springer, 2001, pp. 466-477).

(114) illustrates a meaning representation constructor. It constructs a non-disambiguated semantic representation of the input (e.g., word, phrase, clause, or sentence). The constructor is preferably integrated into the syntactic parser, for example, into parser actions triggered by the parser (such as certain reduce actions in a shift-reduce parser, or node construction in a CYK parser). The meaning representation (or parts of it or references to it) may be stored, e.g., in parse stack nodes in a GLR parser or parsing table nodes in a CYK parser. Controlling the construction of (non-disambiguated) meaning representations from grammar actions was described in U.S. Ser. No. 12/622,272.

The meaning representation may also contain relations between concepts. It is also possible to implement non-disambiguated relations as references to superclasses of relations in the semantic network connected to the actual relations (or link types) using different weights, and see the selection of an actual relation for a non-disambiguated relation as a specialization process.

Sometimes it may not be possible to fully disambiguate a relation or a node (for example, sometimes neither the sentence nor the context provide enough information to fully disambiguate a goal between purpose, locative goal, or, e.g., beneficiary). In such cases, implementing non-disambiguated relations as more general relations (perhaps in a lattice of relations in the knowledge base) enables specializing them to the extent warranted by the available information. This may present a solution to some of the issues raised in McShane (2009).

Together, syntactic parsing and non-disambiguated meaning representation construction form the first phase of constructing the meaning for a natural language expression. The second phase comprises disambiguating the non-disambiguated representation and constructing one or more actual semantic representations from it (the actual semantic representations themselves may still be partially ambiguous). These phases alternate and may be nested or repeated (see FIG. 2).

Disambiguation is performed by the specializing disambiguator (115), which may comprise various subcomponents, including a constraint evaluator (116), disjunction handler (117), ellipsis handler (118), specialization enumerator (119), and combiner (120). It may also comprise, e.g., all or some components of a joint meaning disambiguator and/or a multi-context disambiguator.

The constraint evaluator (116) evaluates a weight for a choice based on various constraints. The constraint evaluator described in U.S. Ser. No. 12/622,272 may be used as-is. With specializing disambiguation, the constraint evaluator is frequently invoked for just one choice at a time (i.e., combinations have only one choice); however, when specializing disambiguation is combined with joint disambiguation, both may be performed simultaneously. Specializing disambiguation may also use a constraint evaluator that calls disambiguation recursively, and returns the best weight from results of the recursive call.

The disjunction handler (117) is used for handling disjunctive meanings (i.e., alternatives that are in an "or" relationship with each other). In the simplest form, it enumerates choices for each of the disjunctive alternatives (weighting each one using the weight of that disjunctive alternative), and then evaluates all the enumerated choices.

The ellipsis handler (118) performs synthetic token insertion as described in the co-owned U.S. patent application Ser. No. 12/613,874, which is hereby incorporated herein by reference.

The specialization enumerator (119) enumerates possible specializations for a semantic descriptor. The specializations may come from multiple sources, such as:
- specializations stored in the knowledge base and linked using a "specialization" or "generalization" relation (cf. SUB relation in Helbig (2006))
- specifications generated dynamically by rules implemented as program code invoked when certain types of specializations are needed
- specializations implied by inference rules written in a logic programming language, such as by satisfying the goal "spec(X, Y)" in a Prolog program, using inference rules specified in Prolog)
- specializations implied by inference rules written in logic, such as first-order predicate logic, modal logic, or a paraconsistent logic.

Generally, the inference may produce both a possible specialization relation and a weight for it (not all generated specializations are necessarily as good or exact).

The combiner (120) combines two or more meaning representations into a new meaning representation (which may also be one of the inputs). It may build new relations (possibly using a relation type identified by a grammar rule). It may also take multiple ambiguous syntactic interpretations, or the syntax rule may specify ambiguous relations, and construct an ambiguous relation that may be later specialized by the disambiguator.

The knowledge base (121) provides background knowledge for the specializing disambiguator, and in some embodiments also for the parser. It may comprise a dictionary/lexicon (128), semantic descriptors (130) such as word meaning descriptions, selectional restriction information, thematic role information, grammar, statistical information (e.g., on co-occurrences), common sense knowledge, etc. It also comprises at least one specialization hierarchy (129) specifying specialization/generalization relations between concepts. Specialization hierarchies need not necessarily be globally consistent or agreed; for example, there might be differing views on what is a generalization of something else, or such generalization relations might be conditional on some assumptions or constraints. Also, there might be more than one set of generalization/specialization relations, for example, one for "anything that is true for the generalization is true for all of its specializations" type logical generalization, and another for more intuitive "most of what is true for the generalization is normally true for the specializations, but there could be exceptions" type more human-like generalizations.

In some embodiments the knowledge base may reside partially in non-volatile storage (e.g., magnetic disk) or on other nodes in a distributed system. Data may be represented in the knowledge base using any combination of different knowledge representation mechanisms, including but not limited to semantic networks, logical formulas, frames, text, images, spectral and temporal patterns, etc.

The specialization hierarchy generator (122) is a component that dynamically generates generalization/specialization relations (essentially, parts of the specialization hierarchy) based on one or more rules. The specialization rules (131) may be, e.g., logical inference rules (see Brachman (2004)) or implemented as computer-executable program code. Examples of rules include rules that generate a specialization relation if one class logically subsumes another class, and a metaphoric interpretation rule that makes the semantic representation of "change for worse" a specialization of "generalized-movement with direction down" (see G. Lakoff & M. Johnson: Metaphors We Live By, University of Chicago Press, 1980, for examples of various metaphors and how they might be interpreted). The specialization relations generated by inference rules may or may not be materialized in the knowledge base (materialization in this context meaning being inserted into the knowledge based, as opposed to just being implicit during processing).

The parse contexts (123) represent alternative parses. Typically there will be a number of alternative parse contexts for each input at each step of parsing. Parse contexts may comprise, besides parser-related data such as a parse stack, semantic information such as the meaning representation (125) (possibly several such representations in disjunctive relation, and each potentially comprising one or more pointers (126) to semantic descriptors) and constraints that must still be satisfied (127). Parse contexts may be combined in some embodiments (e.g., when implementing graph-structured stacks, in which case their meaning representations might be combined with an "OR" (disjunction) operator). In chart parsers, parse contexts may correspond to nodes in the chart or table (each table slot possibly containing a list of alternative parses or nodes). Each parse context or each disjunctive alternative is preferably associated with a weight.

The discourse contexts (124) comprise information about the current discourse and previously parsed sentences (though some embodiments may keep several sentences in the parse context), as well as information about the participants and the background. The discourse context and parse context may both influence disambiguation. For example, individuals, concepts and topic areas that have already been discussed in the same conversation or document are much more likely referents for later expressions in the same document.

Figure 2:
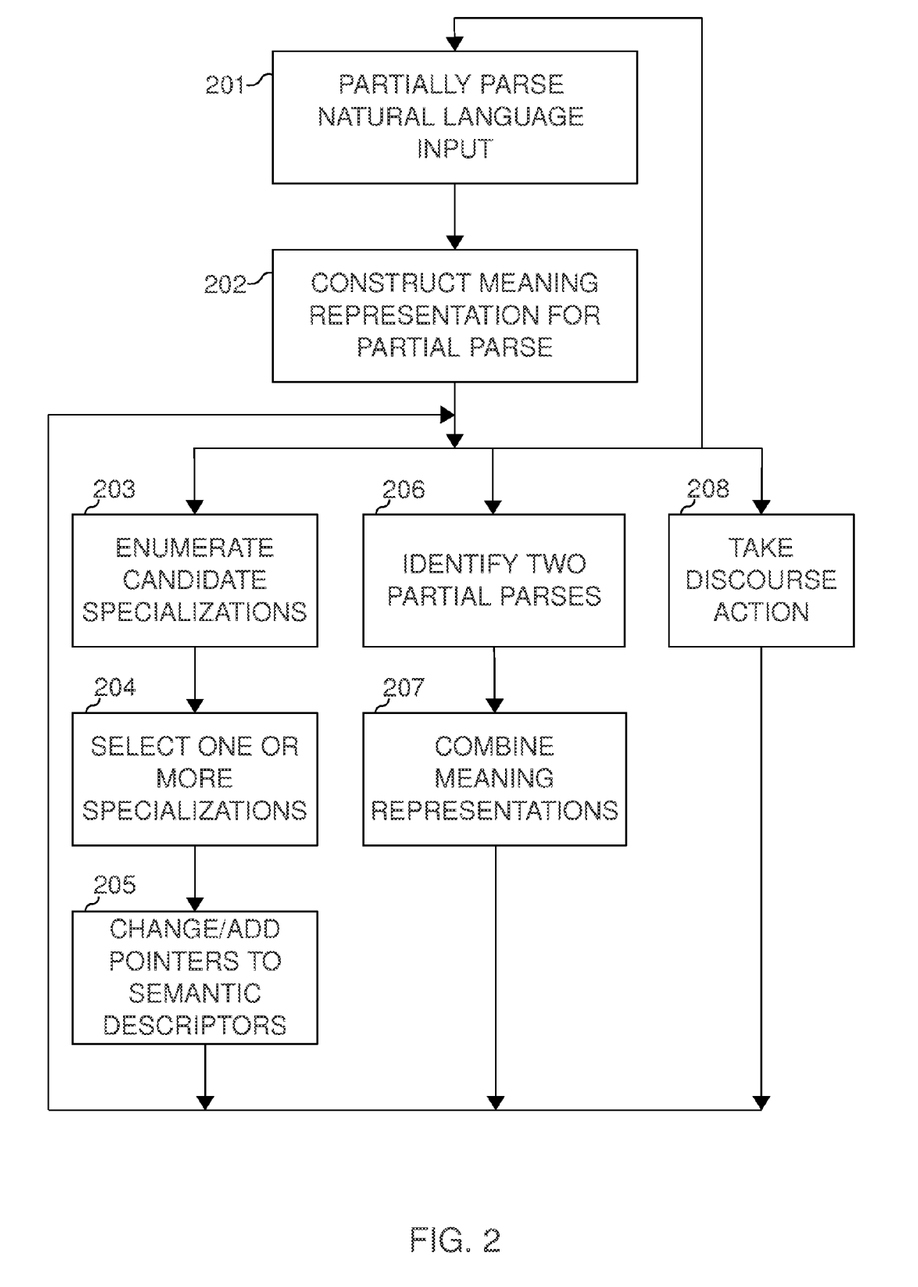
FIG. 2 illustrates specializing disambiguation in a semantic parsing method embodiment.

FIG. 2 illustrates constructing a meaning representation of a natural language expression that may comprise one or more pointers to semantic descriptors that are organized in specialization hierarchies and various actions that may be taken when new natural language expressions are parsed and/or parts of the meaning representation are disambiguated. (201) and (202) illustrate the parsing action of (partially) parsing a natural language expression (e.g., word, phrase, clause, sentence) and constructing a (non-disambiguated) meaning representation for it, respectively.

(203) to (205) illustrate the disambiguation action of specializing a meaning representation by selecting one or more specializations for the meaning representation and changing at least one pointer to a semantic descriptor in the meaning representation to point to a more specific semantic descriptor (according to some specialization hierarchy). Specializing may be triggered by later parsing or disambiguation actions.

(203) enumerates candidate specializations for semantic descriptor(s) in the meaning representation (possibly generating new semantic descriptors using specialization rules). For disjunctive meaning representations, it may enumerate candidate semantic descriptors for all semantic descriptors contained in the meaning representation. It is also possible that the candidates are enumerated for ambiguous meaning representations nested within the representation, such as those identifying relation types and embedded nodes in a semantic network.

(204) selects one or more candidates that are specializations of the semantic descriptor(s) originally pointed to from the meaning representation and that better match constraints implied by semantic and syntactic aspects of the natural language expression parsed so far. It may also refrain from specializing, if there is insufficient information to narrow to particular specialization(s). Alternatively, it may construct disjunctive meaning representations if more than one candidate meaning representation receives a good weight from evaluation, preferably with the condition that neither of the candidates is not a generalization or specialization of the other.

(205) updates the meaning representation to point to the selected (usually more specific) semantic descriptor(s). It may update existing pointers, or may add new pointers (e.g., if a new disjunction was introduced).

(206) and (207) illustrate the disambiguation action of combining two (or more) partial parses and constructing a new meaning representation for the combination (such combining is common in, e.g., constructional grammar (see, e.g., A. Goldberg: Constructions at Work: The Nature of Generalization in Language, Oxford University Press, 2006); it is largely an implementation matter whether such combining is controlled by the grammar level or by meaning construction/disambiguation level). (206) identifies two partial parses (constituents and/or their meaning representations) that may be combined (usually such constituents would be adjacent in the input, but sometimes they may also be separated). (207) combines their meaning representations, e.g., by constructing a new relation in a semantic network between the nodes represented by the meaning representations of the parses being combined. (207) constructs a combined meaning representation by linking the meanings together. Such linking may involve relation creation, or may involve storing one of the meaning representations in a field or slot of the other. Both semantic and syntactic constraints may be used to restrict which parses may be combined. Syntactic-lexical constraints may be used to constrain how the partial parses must occur relative to each other (e.g., one immediately preceding the other) and what kind of lexical words they must be (e.g., directional prepositions/particles, or a specific particle).

For example, phrasal verbs such as "give up" could be processed by having the word "give" have a very general meaning that has a specialization "give up" with a syntactic-lexical constraint requiring the particle "up" following "give".

(208) illustrates taking a discourse action based on the input parsed so far. Examples of discourse actions include processing a query and generating a response, acknowledging, and interrupting the speaker to ask for clarification.

Figure 3:
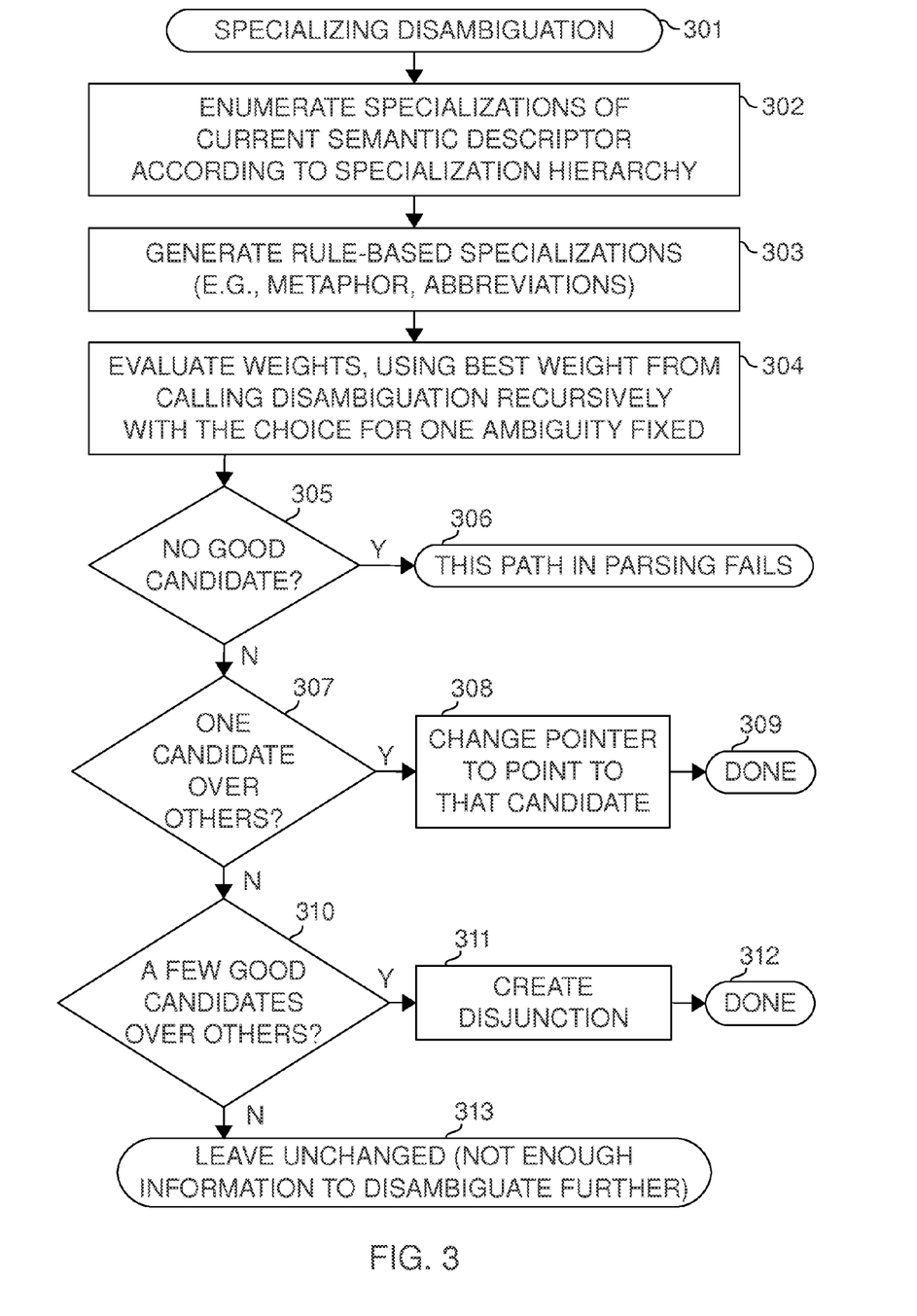
FIG. 3 illustrates method steps in specializing disambiguation in a preferred embodiment.

FIG. 3 illustrates method steps in an embodiment of specializing disambiguation. (301) indicates the start of disambiguation. It takes as input a meaning representation comprising one or more disjunctively related semantic descriptors, some of which may be ambiguous (i.e., have further specializations in a specialization hierarchy). The flowchart illustrates processing of a single semantic descriptor; to process multiple disjunctively related semantic descriptors, either just one might be disambiguated, or specializations might be enumerated for all of them and the whole meaning representation might be (fully or partially) disambiguated in one disambiguation step.

(302) enumerates specializations of a semantic descriptor in the meaning representation (the current semantic descriptor) using a specialization hierarchy stored in the knowledge base. (It could be applied for more than one semantic descriptor, each treated as the current one in turn or in parallel.)

(303) generates additional rule-based specializations for processing, e.g., metaphor and abbreviations. The rule-based specializations complement the ones found in the knowledge base. Together, (302) and (303) correspond to the specializing enumerator (119) in this embodiment.

(304) evaluates weights for enumerated specializations by constructing a new meaning representation where the semantic descriptor(s) being specialized are replaced by the enumerated specialization. It then calls the disambiguation function recursively. If the recursive disambiguation fails, the current specialization is given a very bad weight. Otherwise the best weight of any disjunctive alternative in the returned (fully or partially) disambiguated meaning representation is taken as the weight of the current specialization (adjusted by the weight of the enumerated specialization, e.g., by multiplying its weight and the returned weight together).

(305) checks if any good enough candidate (weighted enumerated specialization) was produced. Good enough may mean, e.g., that one exists at all, or that its weight exceeds some cutoff threshold. If no good enough candidate was produced, this path of parsing fails (306), and the parser control logic will pursue other alternatives (natural language grammars are usually ambiguous and the parsing nondeterministic, and thus parsing is a kind of search process (often using best first or beam search) that tries different avenues until one succeeds).

(307) checks whether there is one candidate sufficiently over others (i.e., having a weight that exceeds the weights of other candidates (if any) by a specific amount or factor, or otherwise exceeds some cutoff). If so, (308) changes a pointer to the current semantic descriptor to point to the semantic descriptor for that candidate (if it does not exist, it may be added to the knowledge base or other data structures at this time). The disambiguation is complete at (309).

(310) checks if there are a relatively small number of candidates sufficiently over others. If so, (311) creates a disjunction of these candidates (replacing the current semantic descriptor(s) by the disjunction, or perhaps changing the pointer to the current semantic descriptor to point to one of the good candidates and adding the other good candidates). (312) completes the disambiguation in this case.

(313) completes disambiguation without being able to further disambiguate the meaning representation at this time (not enough information (constraints) are available yet).

Figure 4:
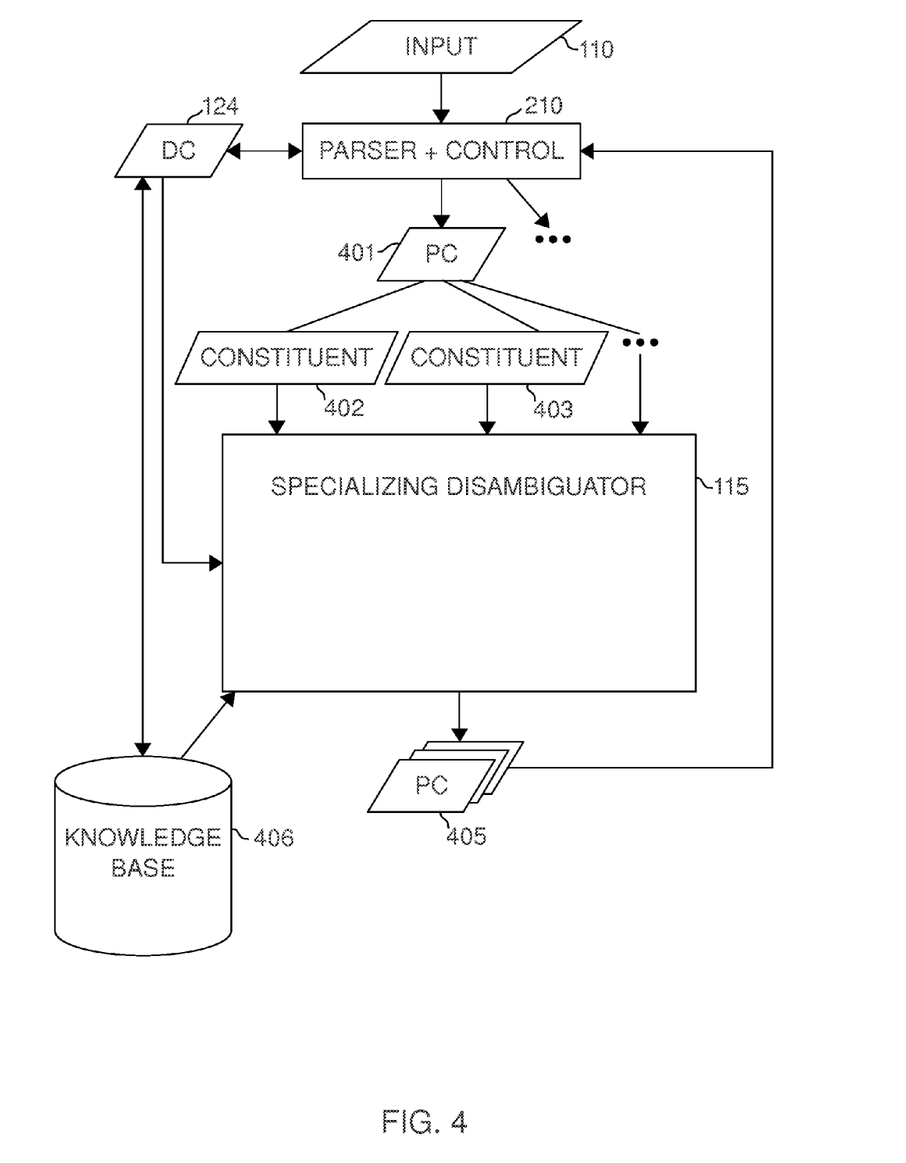
FIG. 4 illustrates how specializing disambiguation can be integrated with a natural language interpretation system.

FIG. 4 illustrates how specializing disambiguation can be embodied in a natural language processing system. The embodiment is shown in the context of one discourse context (124); an actual embodiment would typically have a plurality of discourse contexts (e.g., one for each concurrent user), each with its associated parse contexts. In many embodiments different discourse contexts could be used in parallel, using multiple threads and/or multiple processors. (110) illustrates the input, (400) the syntactic parser and control logic for controlling parsing and triggering disambiguation at certain points during parsing, (401) illustrates a parse context for which specializing disambiguation is to be performed. The constituents (402) and (403) illustrate constituents from the input as interpreted in the parse context (401). There could be one or more of them.

The specializing disambiguator (115) produces a number (zero or more) of new parse contexts (405). Conceptually these parse contexts replace the original parse context (401). In an implementation, it is possible that one of the new parse contexts is the same data structure as (401); however, they could also all be new data structures. If no parse contexts are produced, then it means that the parse in (401) did not make semantic sense; if more than one parse context was produced, then the disambiguation was not unique, but the weights indicate which is the best parse. Further parsing of the input may adjust the weights and trigger further disambiguations, which may eventually raise one of the parse contexts with less than best weight to have the best weight (or even be the only remaining parse context).

Specializing disambiguation preferably uses the knowledge base (406), particularly when enumerating and evaluating the different combinations and when determining what weight to assign to each choice.

The specializing disambiguator of FIG. 4 may also perform joint disambiguation or multi-context disambiguation. Specializing disambiguation is particularly useful for reference resolution for "indefinite" descriptions that refer to previously unmentioned entities or events (they may be, e.g., noun phrases with an indefinite article, other noun phrases, or clauses), and can also be used beneficially when, e.g., new information is gained about previously mentioned entities or events.

FIG. 5 illustrates data flow within an embodiment of a specializing disambiguator. One or more constituents or their meaning representations (402,403) are obtained from a parse context. Enumerators (501,502) are used to enumerate choices for each constituent. The enumerators preferably first return the choice with the best weight, then the second best, etc.

The weight for each choice depends on the weight of the original parse context (401), the relative weight assigned to each choice among the choices for that constituent, and may additionally depend on other data, such as genre information in discourse context, the topic and focus of the conversation or topic of a document, and/or statistical information.

A number of choices (503, 504) are obtained for each constituent by the applicable specialization enumerator(s). In some cases the number may be zero (e.g., if no matching specialization is found), causing specializing disambiguation to return no parse contexts in the preferred embodiment (no choices for one constituent→no combinations). For ambiguous constituents the number of choices is more than one.

Combinations of the choices (505) are generated by a combinator (508). If at least one constituent has multiple choices (and no constituent has zero choices), then multiple combinations will be generated. The a priori weight for each combination is computed from the weights of the choices, and may also depend on other information, such as statistical information about how likely certain senses are to be used together.

Each combination comprises a choice selection (511,512) for each of the constituents (402,403). There should normally be as many choices as there are constituents.

Each combination also comprises an a priori weight (509), computed from the weights of the choices, possibly taking into account also other information (such as co-occurrence statistics).

The a posteriori weight (510) for each combination is evaluated by a constraint evaluator (116), enforcing constraints and using any available statistics and other information in adjusting the weights. Some combinations may be outright rejected by the constraint evaluator.

This results in a number (zero or more) of combinations with a posteriori weights (506). Up to a desired number of best combinations are then selected and parse contexts are created for them (constructing the (partially) disambiguated meaning representation as appropriate in each embodiment, based on the choices indicated in the combination) (507). The pc (parse context) constructor need not be part of specializing disambiguation in all embodiments; it could be performed outside the disambiguator, or some embodiments might not even construct parse contexts.

Figure 6:
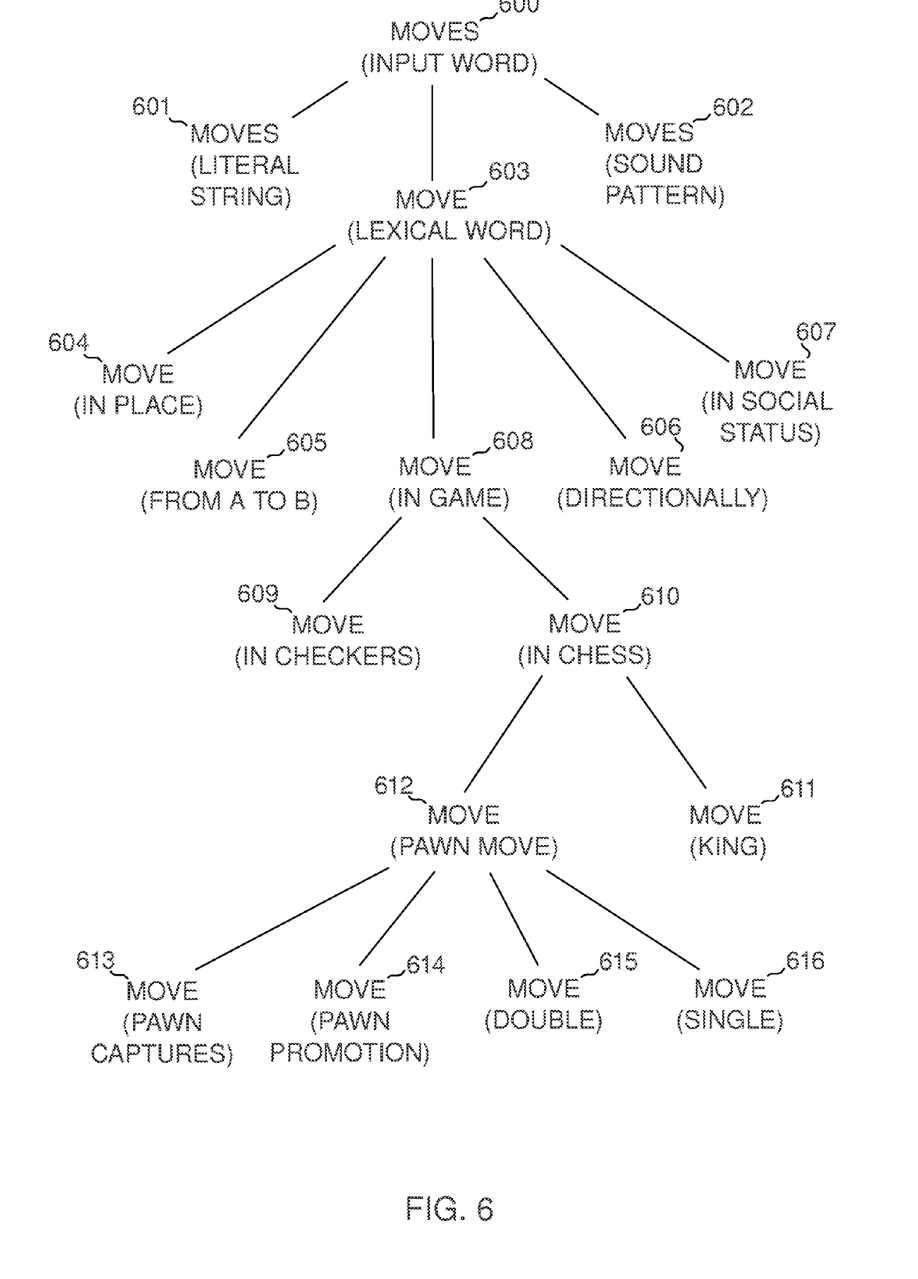
FIG. 6 illustrates a specialization hierarchy of semantic descriptors.

FIG. 6 illustrates a possible specialization hierarchy for the input word "moves" (600). Depending on the context, it might mean the literal string "moves" (601), the sound pattern of the word "moves" (602), or an inflected form of the lexical word "move" (603).

However, the lexical word "move" has many word senses. For example, one might move in place (604), move from place A to place B (605), move directionally (e.g., up or towards the window) (606), move in a hierarchy of social status (607) (such meaning might be dynamically generated using metaphor interpretation rules), or move a piece in a boardgame (608).

Moving a piece can be quite different in different games. For example, the rules for moving in checkers (609) and moving in chess (610) are different. (We have now entered the domain of highly specialized meanings that generally cannot be found in a dictionary.)

For a chess move, one can move different pieces, which behave quite differently. Moving a king (611) (which can move one square in any direction, except to threatened squares) and moving a pawn (612) (which has rather special movement rules) are quite different, and any chess player can certainly picture both actions and describe some of their differences and some of the differing underlying considerations in each kind of move.

Going deeper into moving a pawn, it may capture (613), be promoted (614), move two squares (615), or move just one square (616). Experienced players would further recognize different situations where each of these moves might be played or not, depending on the positions of the piece and other pieces.

It is clear that given a typical natural language sentence, one frequently cannot disambiguate the referred concepts (even something like "a move" is a referring expression that may need to be disambiguated—it refers to an instance of one of these kinds of moves, and its meaning is really quite different depending on which kind of move is meant). However, it is often desirable to disambiguate the concepts to the degree warranted by the input.

Even though the concepts or semantic descriptors are logically organized into a specialization hierarchy (or several such hierarchies), it does not necessarily mean that all specialization relations in the hierarchy would be stored in the database (materialized). Some might be generated dynamically as needed, and be implicit in the rules driving such dynamic generation.

In some embodiments disambiguation may be structured differently from that described above. It is possible to use a function that recursively specializes the word sense, using disambiguation as an evaluation function (taking the weight of the best combination in (506) as the value). Here it is assumed that the word senses for each word form a specialization hierarchy. Such a function might start from the broadest sense (e.g., a node representing just the non-disambiguated lexical word). It would then compute the evaluation function (i.e., do the disambiguation recursively) for each immediately narrower sense in the hierarchy. If one sense gets a sufficiently better score from the evaluation function than the other senses, that sense is selected and specialization continues recursively from that sense. If the desired sense could not be distinguished, specialization may be terminated and the current sense used as the disambiguated word sense. Alternatively, it would be possible to specialize each sense with a sufficiently high score separately, and treat the results as separate choices (alternatives, or disjunction) for the word (constituent).

The resulting specialized sense(s) would then be fixed to that (those) choices, and joint disambiguation would be performed normally.

If there are multiple constituents needing word sense disambiguation, one possibility is to apply the above procedure recursively (first for one constituent, then at the next level for another constituent, until there are no more word sense disambiguations). The computational cost of the straightforward implementation of this may be high, though. An alternative is to select one of the words for specialization, and handle the other constituents requiring word sense disambiguation as in normal joint disambiguation.

A special issue with specialization is that some selectional restrictions may specify a constraint that is satisfied by some senses of a word but not all. Evaluating the selectional restriction directly for a generic sense in the hierarchy of senses could yield a very low a posteriori weight. Thus, when specialization is used, it may be advantageous to modify the restriction/constraint evaluation to return the best weight for any sense below the given sense anywhere in the sense hierarchy.

Such specialization also extends to selecting highly specialized senses of words that are not listed in a dictionary. For example, people know of many ways of eating. For example, eating soup, chips, ribs, beef, spaghetti, eh . . . private parts, fondue, hamburger, fine Italian, or Chinese food with chopsticks are all quite different activities with different implications. If a computer is to be able to understand and answer questions like "what did you eat it with?", "did your hands get dirty?", "did you use a knife?", "did she get it?", or "was it expensive?", it will need to be able to differentiate senses much finer than any dictionary. The specialization methods described here are directly applicable to specializing to such extremely fine-grained senses (to the narrowest sense warranted by the available information). Since disambiguating to a sense with finer subsenses amounts to partial disambiguation, if more information becomes available later, subsequent calls to joint disambiguation may later further disambiguate meaning towards finer senses.

To implement disambiguating to such very fine granularity senses, selectional restrictions can be used. Such restrictions are not necessarily just based on traditional verb arguments or thematic roles—they could, e.g., constrain the location where the activity takes place (fine Italian restaurant, fast food place, Chinese restaurant, home), type of object, type of subject, etc.

It is also possible to treat particles in a similar manner. A particle in the residue (post-verb matter in a verb phrase in English) could be attached to the node for a verb using a special non-disambiguated relation indicating a particle (possibly one of several such relations depending on the position of the particle in the residue or the clause more broadly). The non-disambiguated relation(s) might have several choices for an actual relation, such as "directional particle" and "lexicalized particle". The relation is then disambiguated normally using joint or specializing disambiguation. Phrasal verbs taking that particle have the "lexicalized particle" as a mandatory relation/argument, with that particular particle as a possible value (often the only possible value). Some other verbs might accept the "directional particle" relation. Some verbs might even have specialized senses, where one sense accepts the same particle as a directional particle, and another sense with the lexicalized particle. (For example, imagine someone in a position where they can pass an object to a person above or below them; then someone could ask "did you give it up or down?", triggering a sense different from the phrasal verb "give up".)

The above method is not limited to phrasal verbs with directional particles. It can generalize to a very broad range of fixed constructions and lexical idioms. It is particularly used for ones that do not have a fixed form (e.g., "kick oneself for . . . ", could have a selectional restriction requiring the object to refer to the same person as the subject (perhaps with even a syntactic restriction requiring the object to be a reflexive pronoun), and requiring some relation to which "for" can be disambiguated (e.g., "Cause").

It would also be possible to use the specialization method for disambiguating multi-word expressions, including compound nouns. It is very common for technical documents to introduce their own terminology (new multi-word expressions). The same document may later refer to the same concept using various abbreviated forms. Take, for example, "non-disambiguated semantic representation". This specification might refer to the term in various ways, e.g., "the representation", "the non-disambiguated representation", "the semantic representation", "a first non-disambiguated representation", "a second such representation". While calling it NDSR (without a definition) might be preposterous, it is not uncommon in academic prose to first spell out a multi-word term fully, and then refer to it using its initials without any formal defining language. If "semantic representation" had been called "SR" (with or without definition); then, having introduced "non-disambiguated semantic representation", many authors might call it "non-disambiguated SR".

As the above examples illustrate, proper interpretation of multi-word expressions is critical for wide-coverage deep interpretation of academic prose (and probably for many other genres as well).

Such multi-word expressions may be interpreted using the same specialization mechanism with joint disambiguation. Two-word expressions (e.g., two-word compound nouns) are considered first.

When a two-word compound noun is defined (e.g., when it is first used, whether formally defined or not), a new word sense is created for its second word (the base word). This sense is made to have an optional selectional restriction that says it may have a "lexical front specifier" that is the first word (specified, e.g., using its most top-level sense (covering all senses), or a syntactic constraint); the restriction is made to yield a relatively high weight when the relation is present with the correct value, and lower weight when it is absent. The grammar could have a syntax rule that allows an arbitrary word to be used in front of a noun, causing that word to be attached to the noun with a relation that can disambiguate to the "lexical front specifier" (since there are probably other syntax rules also matching the input, joint syntactic disambiguation could advantageously be used to select the best interpretation). Specializing joint disambiguation then automatically handles recognition of the compound word. When used without the front word (typically with a definite article), the reference would be disambiguated using the normal method described herein (since the new sense is a sub-sense of the most general sense for the base word, it would be matched by reference enumeration).

The same mechanism even works for expressions like "such representation". "Such" here is a referring expression (perhaps it could be called "pro-adjective"?). Its constraints for the referent would be set such that it can match not only adjectives, but also "lexical front specifier" values. Thus, when performing reference enumeration, the first word would be returned by the enumeration as a choice (specifying the word in the constraint by its most generic sense may make this easier to implement).

The same can be generalized to longer compound words by treating the last two words of the expression as the base word (or base word sense). This approach could even account for the ability to leave intermediate words out (e.g., "non-disambiguated [semantic] representation"), e.g., by using a determiner interpretation for the last word that allows it to be treated either as a literal word (taking the top-level sense) or as a reference (at least to multi-word expression base words).

Abbreviations like "SR" can be handled in several ways. One solution is to generate likely abbreviations when the term is defined (e.g., taking the first character of each word, and capitalizing them). Another approach is to handle abbreviations in unknown word handling (which may be triggered even if it matches a known word, but disambiguation does not yield any good enough parses), and in enumerating word senses, compare the potential abbreviation against each multi-word expression that has been used in the discourse (or, e.g., multi-word expressions from the same technical field in the knowledge base).

Once an abbreviation has been used a few times, it would preferably be defined as a new word, at least for the current discourse context. Such abbreviations could also be entered into the knowledge base (perhaps initially as provisional new words, and later perhaps more strongly as new words if the abbreviation is generally used).

The approach may also be generalized to handling proper names in a similar manner.

The approach also extends to other names. For example, in organization names one would frequently refer to parties using abbreviated names (leaving out some of the words). "The party" would have a known reference in many cultures. So would "the Communist Party" in most countries. If a particular country has been discussed, a good reference enumeration method will generate for "Communist Party" a choice referring to the Communist Party of that country. Even references like "the party of the communists" could be resolved using the method by looking for references to "party", interpreting the restrictive prepositional phrase as a constraint. The reference enumerator will enumerate associated parties meeting the constraint (this particular constraint might require some inference to be performed, to determine each party is "a party of the communists"). Also, the preposition "of" would need to be disambiguated to mean something like "member type", but this can automatically be done by joint or specializing disambiguation.

The above are only exemplary embodiments, and clearly the selectional restrictions and constraints could be structured in many ways. In any case, the examples show that specializing disambiguation can be very useful. The examples also describe how to implement it for a variety of embodiments.

In some embodiments some nodes might be only partially (or not at all) disambiguated in the first call, and their final disambiguation might be postponed to a later call to the joint disambiguator, at which time more information is available for the disambiguation. It is possible to leave some nodes not fully disambiguated even in the final network; the last call to the joint disambiguator could, for example, create disjunctive expressions for such nodes or relations.

Partial disambiguation may be implemented by enumerating alternative disambiguations for a node by arranging the alternatives into a hierarchy (e.g., first coarse word senses, and then more fine grained word senses under them). The enumeration process might check if there is more than one acceptable (or sufficiently high weight) fine grained sense under a coarse sense, and in that case only disambiguate to the coarse sense, but otherwise disambiguate all the way to the fine grain sense.

Joint and/or specializing disambiguation can also be advantageously utilized in connection with ellipsis resolution, including both anaphoric ellipsis and cataphoric ellipsis, particularly when combined with the techniques disclosed in the U.S. patent application Ser. No. 12/613,874.

Metaphor interpretation may dynamically construct new metaphoric senses for words if no found interpretation looks promising (using metaphor interpretation methods from the literature, such as the book by Lakoff & Johnson). Specializing disambiguation may utilize rules for generating metaphoric interpretations. Suggestions for rules that might be used can be found in G. Lakoff & M. Johnson: Metaphors We Live By, University of Chicago Press, 1980, and G. Lakoff: Philosophy in the Flesh: The Embodied Mind and Its Challenge to Western Thought, Basic Books, 1999.

Metaphoric interpretation rules could be part of the grammar, could be stored in a separate configuration file, or could be stored in the knowledge base. They might also be automatically learned (either from textual explanations or from examples where the intended meaning is clear).

Since metaphoric expressions frequently involve both the verb and its arguments, clause-level disambiguation might be the ideal place for metaphor interpretation. Clause-level disambiguation may be triggered by grammar actions.

Construction of metaphoric specializations may be implemented by a "metaphor interpreter" connected to the "selector+pc constructor" (507) element, and triggered if the weight is below a limit (or rather, weight has dropped sufficiently from the weight of the original pc (401).

New constructed metaphoric senses could be added to the knowledge base (406) or discourse context (124), and be available as extra senses for later disambiguations (perhaps through a word sense enumerator).

Whenever statistical information is referred to in this specification or used by the parser or the evaluators, such statistical information may be obtained using any suitable manner, including but not limited to manual configuration (e.g., in the grammar or the knowledge base), frequency counts or other statistics based on whether parses subsequently become the best or fail, backpropagation-style learning, co-occurrence statistics, and machine learning methods. The references incorporated herein describe a number of machine learning methods, and more can be found from any textbook on machine learning; statistical and machine learning methods for automatically learning such statistical information are known in the art.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques.

A pointer should be interpreted to mean any reference to an object, such as a memory address, an index into an array of objects, a key into a (possibly weak) hash table containing objects, a global unique identifier, or some other object identifier that can be used to retrieve and/or gain access to the referenced object. In some embodiments pointers may also refer to fields of a larger object.

In this specification, selecting has its ordinary meaning, with the extension that selecting from just one alternative means taking that alternative (i.e., the only possible choice), and selecting from no alternatives either returns a "no selection" indicator (such as a NULL pointer), triggers an error (e.g., a "throw" in Lisp or "exception" in Java), or returns a default value, as is appropriate in each embodiment.

A computer may be any general or special purpose computer, workstation, server, laptop, handheld device, smartphone, wearable computer, embedded computer, a system of computers (e.g., a computer cluster, possibly comprising many racks of computing nodes), distributed computer, computerized control system, processor, or other similar apparatus capable of performing data processing, including without limitation specialized ASICs that may implement any elements or aspects of the invention in digital logic.

Apparatuses may be computers, but are not restricted to traditional computers. They may also be, for example, robots, vehicles, control systems, instruments, games, toys, or home or office appliances, and may contain additional components known in the art. The invention can provide benefits in various kinds of apparatus embodiments, particularly by enabling better natural language interfaces to be constructed for them, and therefore improving their ease of use, user experience, and competitiveness.

Computer-readable media can include, e.g., computer-readable magnetic data storage media (e.g., floppies, disk drives, tapes), computer-readable optical data storage media (e.g., disks, tapes, holograms, crystals, strips), semiconductor memories (such as flash memory, memristor memory, and various ROM and RAM technologies), media accessible through an I/O interface in a computer, media accessible through a network interface in a computer, networked file servers from which at least some of the content can be accessed by another computer, data buffered, cached, or in transit through a computer network, or any other media that can be accessed by a computer.

What is claimed is:

1. A method of semantically parsing a natural language expression, comprising:
   constructing, by a processor, a first ambiguous meaning representation for a first natural language expression;
   fully or partially disambiguating, by a processor, the first meaning representation by specializing it by replacing a first semantic descriptor in it by a second, more specific semantic descriptor;
   associating with at least one semantic descriptor in the meaning representation a weight indicating an evaluation of how good an alternative it is; and
   adjusting at least one such weight in response to a later parsing or disambiguation action.

2. The method of claim 1, wherein the second semantic descriptor better matches constraints imposed by semantic and syntactic aspects of the natural language expression parsed so far in the discourse context where the parsing takes place.

3. The method of claim 1, further comprising further disambiguating a meaning representation that has already been partially disambiguated by further specializing it by replacing the second semantic descriptor in it by a third, even more specific semantic descriptor.

4. The method of claim 1, wherein the second semantic descriptor is more specific than any dictionary word sense stored in the lexicon of the computer.

5. The method of claim 1, further comprising selecting the second semantic descriptor based in part on syntactic-lexical constraints.

6. The method of claim 5, wherein at least one syntactic-lexical constraint requires that the clause contains a certain kind of lexical particle.

7. The method of claim 5, wherein at least one syntactic-lexical constraint requires that the expression be preceded by a certain lexical word.

8. The method of claim 1, further comprising:
dynamically generating at least one specialization relation in at least one specialization hierarchy by one or more hierarchy generating rules.

9. A method of semantically parsing a natural language expression, comprising:
constructing, by a processor, a first ambiguous meaning representation for a first natural language expression; and
fully or partially disambiguating, by a processor, the first meaning representation by specializing it by replacing a first semantic descriptor in it by a second, more specific semantic descriptor;
wherein:
the constructed meaning representation comprises a first pointer to a first semantic descriptor that is logically organized in one or more specialization hierarchies;
the disambiguating comprises changing the pointer to point to the second semantic descriptor; and
the second semantic descriptor is a specialization of the first semantic descriptor according to a first specialization hierarchy.

10. The method of claim 9, further comprising including in the meaning representation a second pointer to a second semantic descriptor that is not a generalization or specialization of the first semantic descriptor in the first specialization hierarchy, and treating the first and second pointer disjunctively.

11. The method of claim 10, further comprising:
adding a new pointer to the meaning representation, the new pointer pointing to a specialization of the first semantic descriptor but not a specialization or generalization of the second semantic descriptor.

12. A method of semantically parsing a natural language expression, comprising:
constructing, by a processor, a first ambiguous meaning representation for a first natural language expression;
fully or partially disambiguating, by a processor, the first meaning representation by specializing it by replacing a first semantic descriptor in it by a second, more specific semantic descriptor; and
combining the first meaning representation with a second meaning representation associated with a second natural language expression to form a third meaning representation comprising a relation between the first and second meaning representations, the relation type identified by a fourth meaning representation.

13. The method of claim 12, wherein at least one semantic descriptor for the fourth meaning representation is specified in the grammar.

14. The method of claim 12, further comprising:
fully or partially disambiguating the fourth meaning representation by replacing a semantic descriptor in it by a more specific semantic descriptor.

15. The method of claim 12, wherein the second natural language expression and the second meaning representation are inserted as part of processing an elliptic or zero-realized construction.

16. A method of semantically parsing a natural language expression, comprising:
constructing, by a processor, a first ambiguous meaning representation for a first natural language expression;
fully or partially disambiguating, by a processor, the first meaning representation by specializing it by replacing a first semantic descriptor in it by a second, more specific semantic descriptor; and
dynamically generating at least one specialization relation in at least one specialization hierarchy by one or more hierarchy generating rules;
wherein at least one of the
hierarchy generating rules generates a metaphoric interpretation for a class of natural language expressions.

17. An apparatus comprising:
a means for constructing a first ambiguous meaning representation for a first natural language expression; and
a means for fully or partially disambiguating the first meaning representation by specializing it by replacing a first semantic descriptor in it by a second, more specific semantic descriptor;
wherein:
the constructed meaning representation comprises a first pointer to a first semantic desriptor that is logically organized in one or more specialization hierarchies;
the disambiguating comprises changing the pointer to point to the second semantic descriptor; and
the second semantic descriptor is a specialization of the first semantic descriptor according to a first specialization hierarchy.

18. A non-transitory computer-readable medium operable to cause a computer to
perform semantic parsing, comprising:
computer readable program code means for constructing a first ambiguous meaning representation for a natural language expression; and
computer readable program code means for fully or partially disambiguating the first meaning representation by specializing it by replacing a first semantic descriptor in it by a second, more specific semantic descriptor;
wherein:
the constructed meaning representation comprises a first pointer to a first semantic descriptor that is logically organized in one or more specialization hierarchies;
the disambiguating comprises changing the pointer to point to the second semantic descriptor; and
the second semantic descriptor is a specialization of the first semantic descriptor according to a first specialization hierarchy.

* * * * *